US007444235B2

(12) United States Patent
Anilovich et al.

(10) Patent No.: US 7,444,235 B2
(45) Date of Patent: Oct. 28, 2008

(54) POST CATALYST OXYGEN SENSOR DIAGNOSTIC

(75) Inventors: Igor Anilovich, Walled Lake, MI (US); Thomas L. Ting, Medina, MN (US); Zhong Wang, Westland, MI (US); Justin F. Adams, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 85 days.

(21) Appl. No.: 11/671,916

(22) Filed: Feb. 6, 2007

(65) Prior Publication Data

US 2008/0184695 A1 Aug. 7, 2008

(51) Int. Cl.

| | |
|---|---|
| ***G06F 19/00*** | (2006.01) |
| ***F01N 3/10*** | (2006.01) |
| ***F02D 41/14*** | (2006.01) |
| ***G01M 15/00*** | (2006.01) |

(52) U.S. Cl. ......................... 701/114; 701/109; 60/274; 60/276; 73/114.73

(58) Field of Classification Search ................. 701/101, 701/102, 109, 114; 60/274, 276, 277; 123/688; 73/114.71–114.73

See application file for complete search history.

(56) References Cited

U.S. PATENT DOCUMENTS

| | | | | |
|---|---|---|---|---|
| 5,228,335 | A * | 7/1993 | Clemmens et al. | 73/114.73 |
| 5,845,489 | A * | 12/1998 | Dohta et al. | 60/276 |
| 5,956,945 | A * | 9/1999 | Kumar et al. | 60/274 |
| 6,631,611 | B2 * | 10/2003 | Shi et al. | 60/276 |
| 6,694,243 | B2 * | 2/2004 | Shi et al. | 701/114 |
| 6,799,419 | B2 * | 10/2004 | Rosel et al. | 60/276 |
| 7,278,304 | B2 * | 10/2007 | Zanini-Fisher et al. | 73/114.71 |
| 2007/0125075 | A1 * | 6/2007 | Zanini-Fisher et al. | 60/277 |

FOREIGN PATENT DOCUMENTS

| | | | | |
|---|---|---|---|---|
| JP | 2005214073 | A * | 8/2005 | 60/276 |

* cited by examiner

*Primary Examiner*—Willis R Wolfe, Jr.

(57) ABSTRACT

An engine exhaust sensor diagnostic system for an exhaust system including a catalyst and a post-catalyst oxygen sensor includes a first module that calculates a total integrated area based on a signal generated by the post-catalyst oxygen sensor. A second module compares the total integrated area to a threshold integrated area and generates a pass status signal when the total integrated area is less than the threshold integrated area.

23 Claims, 6 Drawing Sheets

POST CATALYST OXYGEN SENSOR DIAGNOSTIC

FIELD OF THE INVENTION

The present invention relates to diagnostic systems for vehicles, and more particularly to a post-catalyst oxygen sensor diagnostic.

BACKGROUND OF THE INVENTION

During the combustion process, gasoline is oxidized and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds.

Automobile exhaust systems include a catalytic converter that reduces exhaust emissions by chemically converting the exhaust gas into carbon dioxide ($CO_2$), nitrogen (N), and water ($H_2O$). Exhaust gas oxygen sensors generate signals indicating the oxygen content of the exhaust gas. An inlet or pre-catalyst oxygen sensor monitors the oxygen level associated with an inlet exhaust stream of the catalytic converter. This inlet $O_2$ sensor is also the primary feedback mechanism that maintains the air-to-fuel (A/F) ratio of the engine at the chemically correct or stoichiometric A/F ratio that is needed to support the catalytic conversion processes. An outlet or post-catalyst oxygen sensor monitors the oxygen level associated with an outlet exhaust stream of the catalytic converter. The post-$O_2$ sensor signal is used for secondary A/F ratio control.

System diagnostics require properly functioning oxygen sensors. Therefore, the oxygen sensors are periodically checked to ensure proper function. Traditionally, diagnostics employ intrusive checks to check the operation of the sensors. During the intrusive checks, the A/F ratio is manipulated and the sensor response is monitored. However, these intrusive checks may increase exhaust emissions and/or cause engine instability and reduced driveability that may be noticeable by a vehicle operator. Further, traditional diagnostics are more complex and computationally intense than desired.

SUMMARY OF THE INVENTION

Accordingly, the present invention provides an engine exhaust sensor diagnostic system for an exhaust system including a catalyst and a post-catalyst oxygen sensor. The engine exhaust sensor diagnostic system includes a first module that calculates a total integrated area based on a signal generated by the post-catalyst oxygen sensor. A second module compares the total integrated area to a threshold integrated area and generates a pass status signal when the total integrated area is less than the threshold integrated area.

In another feature, the second module generates a fail status signal when the total integrated area is not less than the threshold integrated area.

In other features, the engine exhaust sensor diagnostic system further includes a third module that normalizes the total integrated area. The total integrated area is normalized based on an average flow rate of exhaust gas. Alternatively, the total integrated area is normalized based on a switching rate of a pre-catalyst oxygen sensor.

In still other features, the first module discounts an integrated area that is associated with a signal reversal from the total integrated area. Accordingly, the engine exhaust sensor diagnostic system further includes a third module that monitors the signal and that indicates the signal reversal when the signal exceeds a continuously updated minimum signal value during a rich to lean transition. Alternatively, the engine exhaust sensor diagnostic system of further includes a third module that monitors the signal and that indicates the signal reversal when the signal falls below a continuously updated maximum signal value during a lean to rich transition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
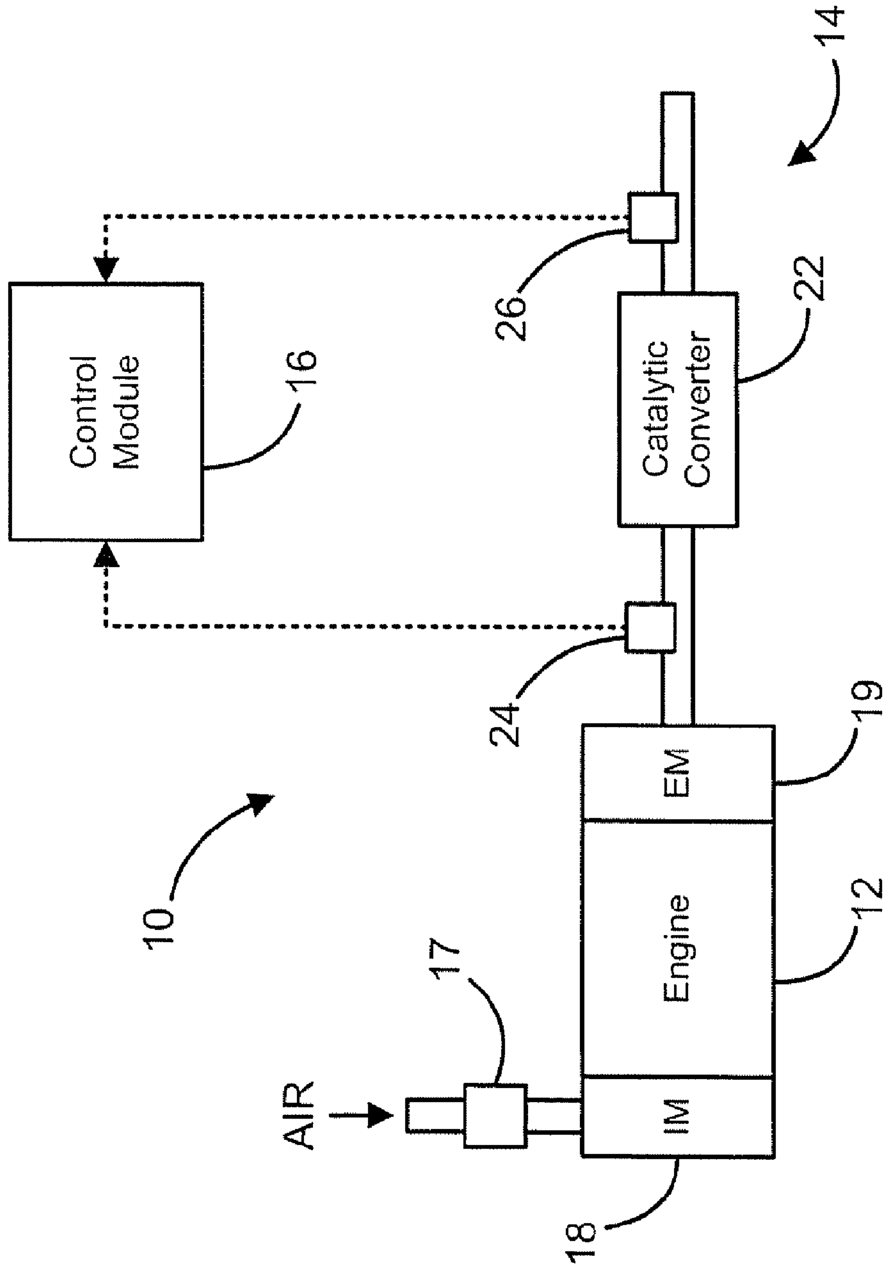
FIG. 1 is a functional block diagram of an engine system including a control module that executes a post-catalyst oxygen sensor diagnostic according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 10 includes an engine 12, an exhaust system 14 and a control module 16. Air is drawn into the engine 12 through a throttle 17 and an intake manifold 18, and is mixed with fuel inside the engine 12. The air and fuel mixture is combusted within cylinders (not shown) to generate drive torque. The gases produced via combustion exit the engine through an exhaust manifold 19 and the exhaust system 14. The exhaust system 14 includes a catalytic converter 22, a pre-catalyst or inlet oxygen sensor 24, hereinafter pre-O2 sensor 24 and a post-catalyst oxygen sensor 26, herein after post-O2 sensor 26. The exhaust gases are treated within the catalytic converter 22 and are exhausted to atmosphere.

The pre-O2 sensor 24 and the post-O2 sensor 26 generate respective voltage signals that are communicated to the control module 16. The pre-O2 and post-O2 sensor signals indicate the oxygen content of the exhaust entering and exiting the catalytic converter 22, respectively. The control module 16 communicates with a fuel system (not shown) to regulate fuel flow to the engine 12 based on the sensor signals.

Figure 2:
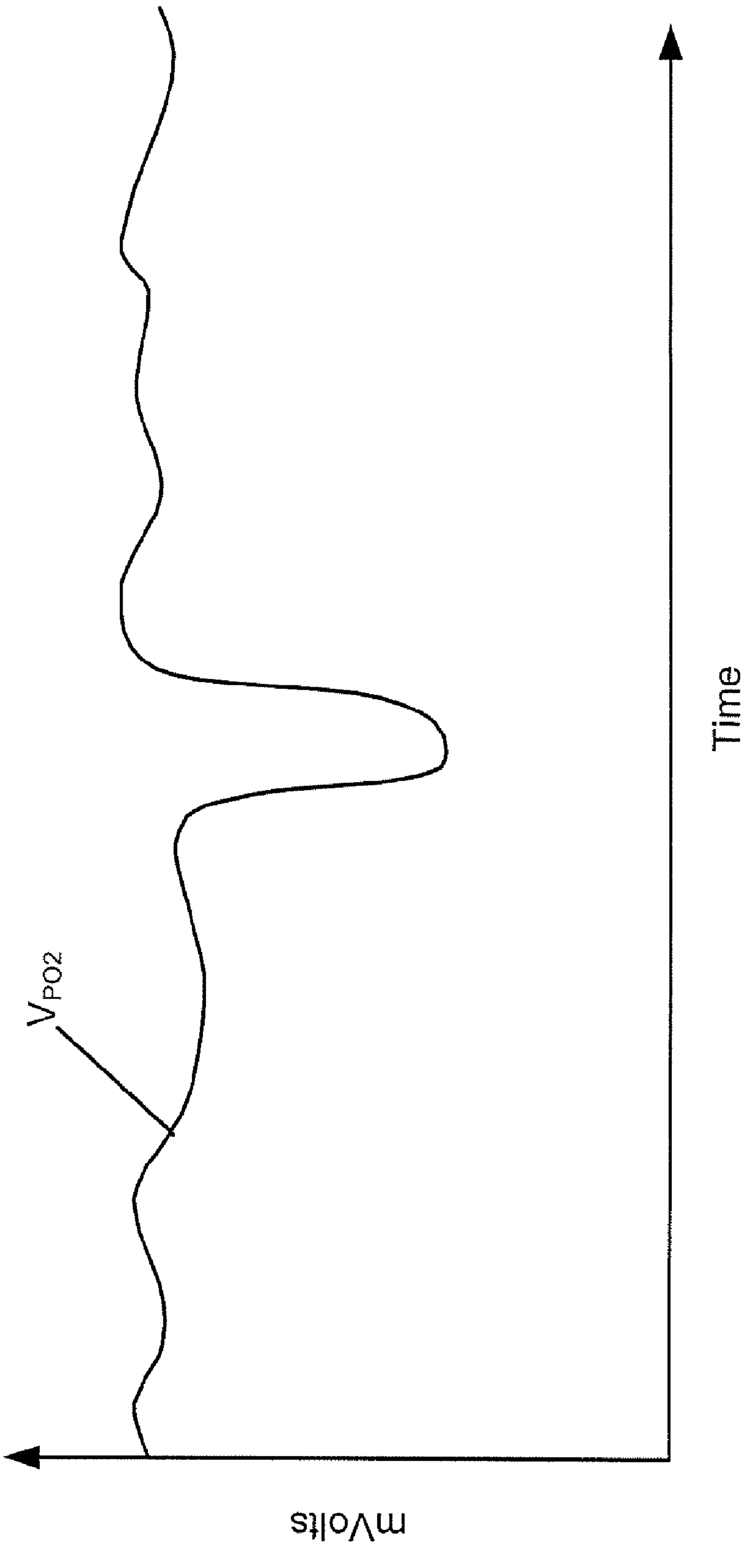
FIG. 2 is a graph illustrating an exemplary signal generated by a post-catalyst oxygen sensor.

Referring now to FIG. 2, the post-O2 sensor 26 is typically a narrow range "switching" sensor. The voltage output signal is generated by the sensor based on the oxygen content of the exhaust gases passing thereby. As best seen in FIG. 2, an oxygen sensor signal generated by a healthy or operating sensor varies based on the oxygen content of the exhaust gas. The most common characteristic of a malfunctioning oxygen sensor is a lazy or sluggish response. For example, with a malfunctioning oxygen sensor, an increased amount of time is required for the signal to transition from rich to lean and/or lean to rich.

Figure 3:
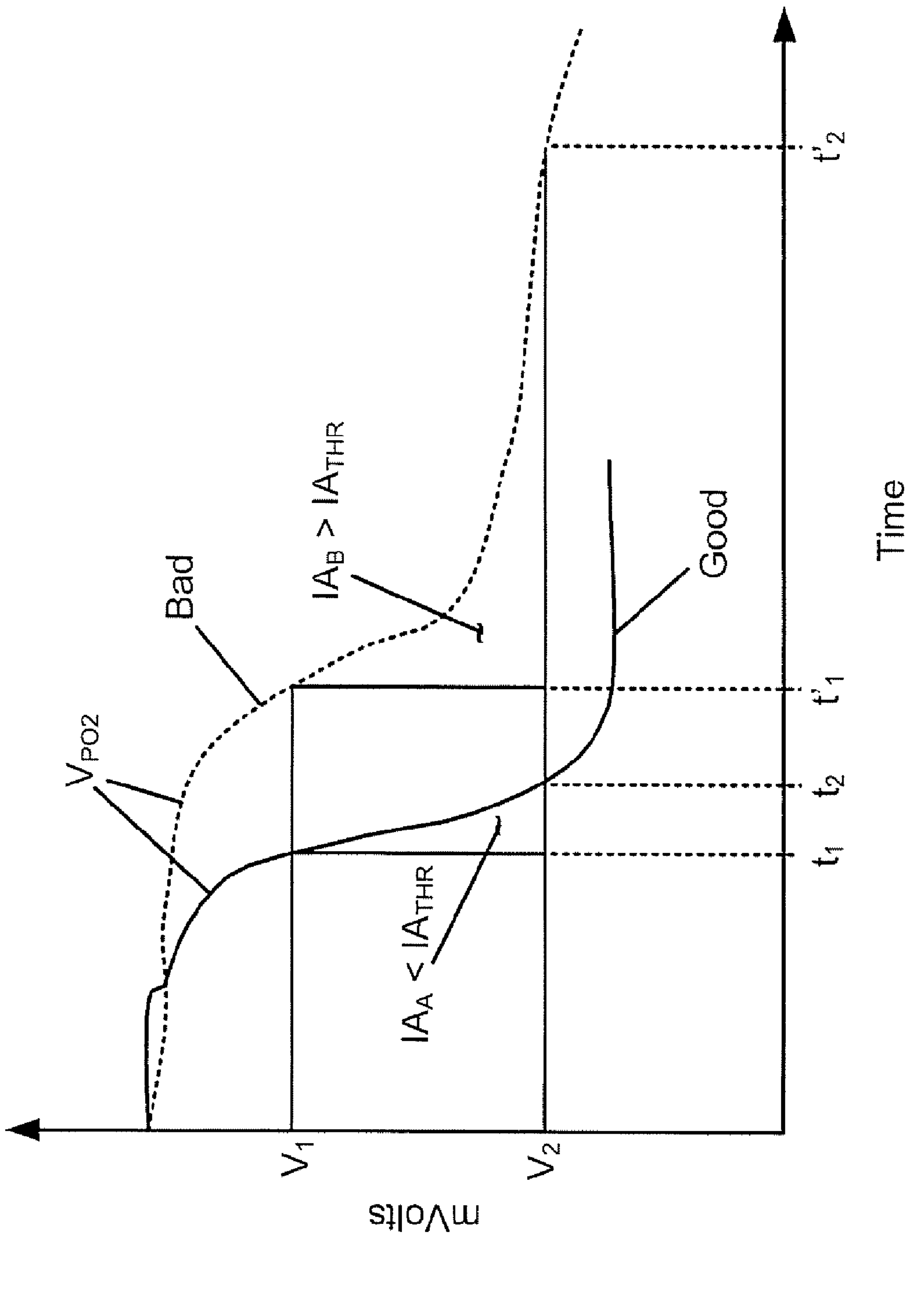
FIG. 3 is a graph illustrating exemplary oxygen sensor signals in accordance with the post-catalyst oxygen sensor diagnostic of the present invention.

Referring now to FIG. 3, the post-catalyst oxygen sensor diagnostic of the present invention monitors the performance of the post-O2 sensor 26 by calculating an integrated area (IA) above or below the sensor's voltage signal ($V_{PO2}$) during a transition from rich to lean and/or lean to rich. As the signal transition speed decreases, the IA increases. The IA is compared to a threshold IA ($IA_{THR}$) to determine whether the signal has so deteriorated that the post-O2 sensor 26 should be serviced or replaced.

The post-catalyst oxygen sensor diagnostic is preferably executed during a non-intrusive action. For example, the diagnostic can be executed during a deceleration fuel cut-off (DFCO) maneuver, during which the signal transitions from rich to lean as a result of fuel cut-off to the cylinders during vehicle deceleration. The diagnostic can similarly be executed during a non-intrusive maneuver, during which the signal transitions from lean to rich. It is also anticipated, however, that the diagnostic can be executed by intrusively commanding lean to rich or rich to lean transitions as desired.

The IA is calculated between first and second voltages $V_1$, $V_2$, respectively, and the times $t_1$, $t_2$, at which the signal achieves the respective voltages. $V_1$ and $V_2$ are selected based on preliminary data analysis of the lean (e.g., during DFCO) and rich transitions for a plurality of combinations of the post-catalyst oxygen sensor and catalytic converter states. For example, the preliminary data includes data collected using a good (i.e., appropriately functioning) post-catalyst oxygen sensor combined with a good catalyst, a good post-catalyst oxygen sensor combined with a bad catalyst (i.e., not appropriately functioning), a bad post-catalyst oxygen sensor combined with a bad catalyst, and a bad post-catalyst oxygen sensor combined with a good catalyst. The voltages that are the most sensitive to failure of the post-catalyst oxygen sensor and at the same time is the least sensitive to the catalytic converter state are selected. The voltages are selected separately for the rich to lean and for the lean to rich transitions.

Figure 4:
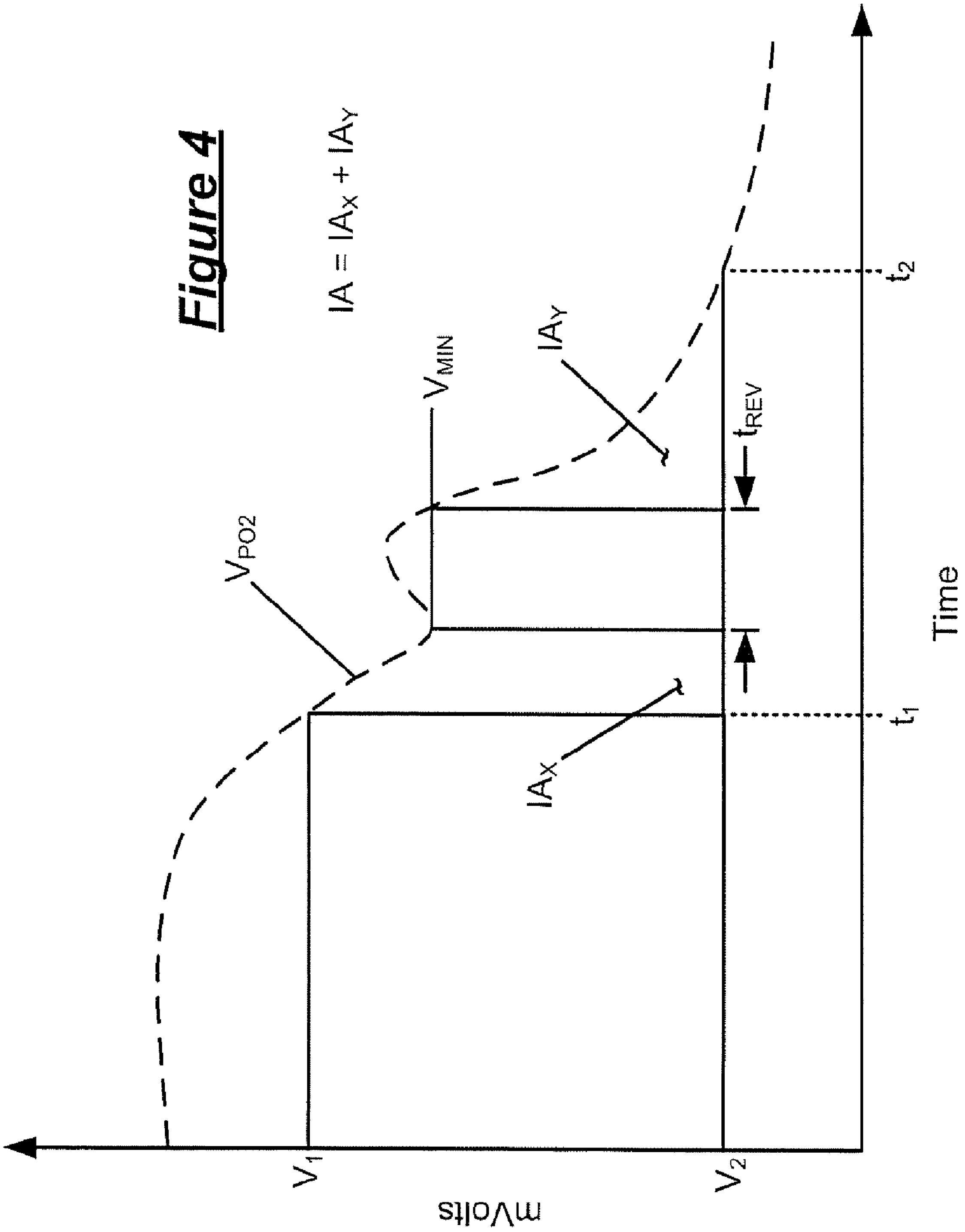
FIG. 4 is a graph illustrating reverse freezing in accordance with the post-catalyst oxygen sensor diagnostic of the present invention.

Referring now to FIG. 4, the post-catalyst oxygen sensor implements a reverse freezing routine to filter out bad data during signal transition. In some instances, the signal can temporarily reverse during the transition. For example, in the case of a rich to lean transition, as illustrated in FIG. 4, the signal can temporarily increase or spike in a direction opposite to the direction of the transition. More specifically, because the signal is decreasing during this transition, a minimum voltage ($V_{MIN}$) is continuously updated. If the signal reverses (i.e., is greater than $V_{MIN}$), reversing has occurred. Accordingly, the post-catalyst oxygen sensor diagnostic ignores the area underneath the signal during the time that the signal is reversed ($t_{REV}$). The IA is calculated as the sum of the usable or valid integrated areas (e.g., $IA_X$ and $IA_Y$). In the case of a lean to rich transition, the signal increases during transition. Therefore, in this case, a maximum voltage ($V_{MAX}$) is continuously updated and reversing occurs if the signal falls below $V_{MAX}$.

The post-catalyst oxygen sensor diagnostic also implements a normalization routine of the integral parameters. More specifically, a normalized IA ($IA_{NORM}$) is calculated, which is compared to $IA_{THR}$. In one feature, IA is normalized based on the average exhaust flow at the beginning of the rich to lean and lean to rich transition to reduce variation of IA due to the average exhaust flow changes at the beginning of the transition. The following formula is used for the average exhaust flow based normalization:

$$IA_{NORM}=(IA)(E_{AVG})^T$$

where $E_{AVG}$ is the average exhaust flow. The coefficient T is a calibration value that is determined based on a least squared statistical method, which is supported using an automated tool that allows multiple non-normalized data input and normalized output for the coefficient. A different value of T is provided based on whether the transition is rich to lean or lean to rich. In another feature, IA is normalized based on the switch rate of the pre-O2 sensor 24 (e.g., between 600 and 300 mV) during the rich to lean and the lean to rich transitions. The following formula is used for the average exhaust flow based normalization:

$$IA_{NORM}=(IA)(SR)^T$$

where SR is the switch rate of the pre-O2 sensor 24 and the coefficient T is a calibration value that is determined in similar manner as described above.

Figure 5:
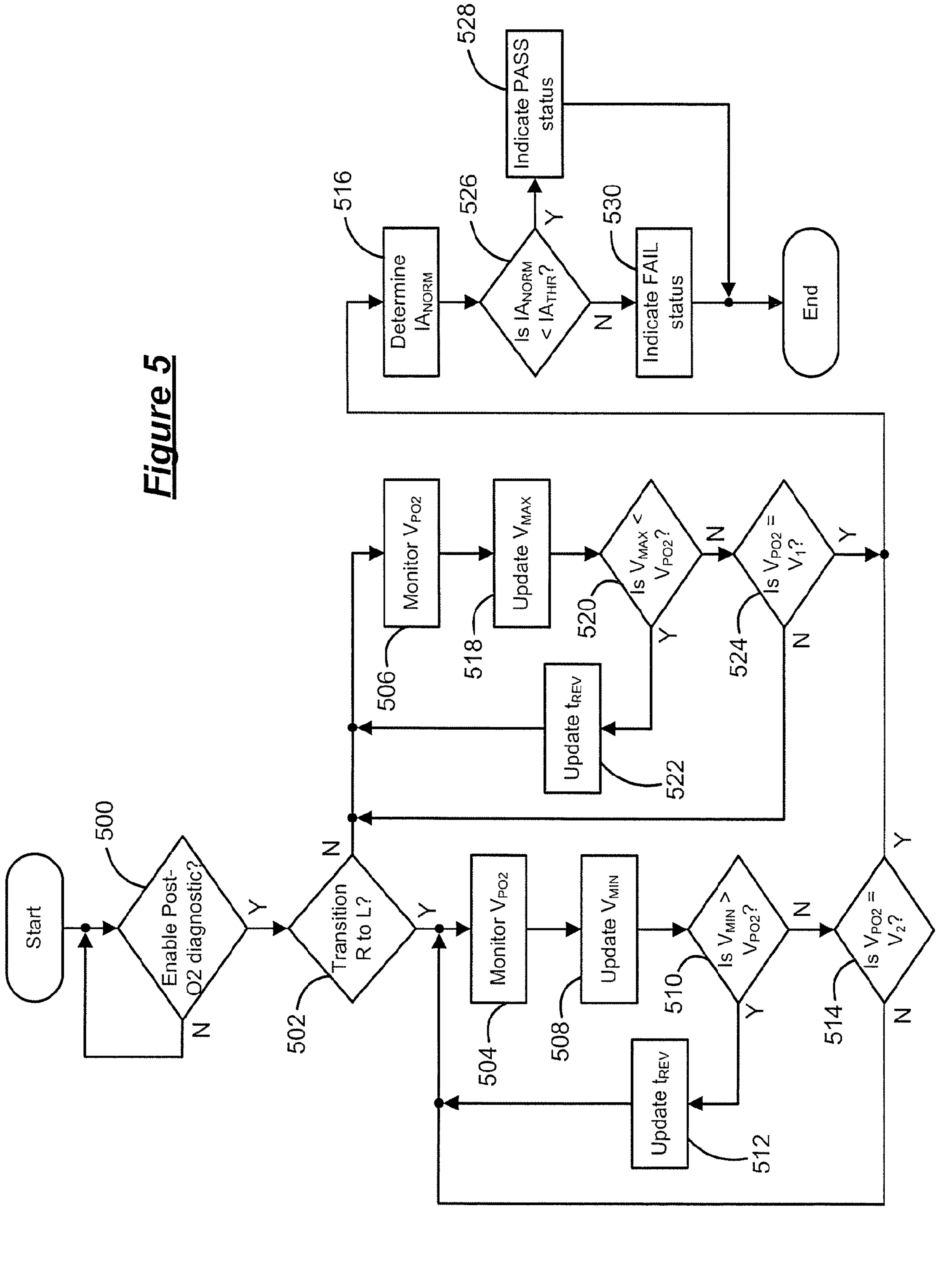
FIG. 5 is a flowchart illustrating exemplary steps executed by the post-catalyst oxygen sensor diagnostic.

Referring now to FIG. 5, exemplary steps executed by the post-catalyst oxygen sensor diagnostic of the present invention will be described. In step 500, control determines whether to enable the post-catalyst oxygen sensor diagnostic. For example, if a non-intrusive fuel transition is to occur (e.g., DFCO), the diagnostic is enabled. It is appreciated, however, that the diagnostic can be enabled any time deemed appropriate and can be enabled using an intrusive fuel transition. If the diagnostic is not enabled, control loops back. If the diagnostic is enabled, control determines whether the fuel transition is from rich to lean in step 502. If the transition is a rich to lean transition, control continues in step 504. If the transition is not a rich to lean transition, control continues in step 506.

In step 504, control monitors $V_{PO2}$. Control updates $V_{MIN}$ in step 508. In step 510, control determines whether $V_{MIN}$ exceeds $V_{PO2}$. If $V_{MIN}$ exceeds $V_{PO2}$, a signal reversal has occurred and the area beneath $V_{PO2}$ during this time should not be considered. Accordingly, control updates $t_{REV}$ in step 512 and loops back to step 504. If $V_{MIN}$ does not exceed $V_{PO2}$, control determines whether $V_{PO2}$ is equal to $V_2$ in step 514. If $V_{PO2}$ is not equal to $V_2$, control loops back to step 504. If $V_{PO2}$ is equal to $V_2$, control continues in step 516.

In step 506, control monitors $V_{PO2}$. Control updates $V_{MAX}$ in step 518. In step 520, control determines whether $V_{MAX}$ is less than $V_{PO2}$. If $V_{MAX}$ is less than $V_{PO2}$, a signal reversal has occurred and the area beneath $V_{PO2}$ during this time should not be considered. Accordingly, control updates $t_{REV}$ in step 522 and loops back to step 506. If $V_{MAX}$ is not less than $V_{PO2}$, control determines whether $V_{PO2}$ is equal to $V_2$ in step 524. If $V_{PO2}$ is not equal to $V_1$, control loops back to step 506. If $V_{PO2}$ is equal to $V_1$, control continues in step 516.

In step 516, control determines $IA_{NORM}$. Control determines whether $IA_{NORM}$ is less than $IA_{THR}$ in step 526. If $IA_{NORM}$ is less than $IA_{THR}$, control indicates a PASS status for the post-O2 sensor 26 in step 528 and control ends. If $IA_{NORM}$ is not less than $IA_{THR}$, control indicates a FAIL status for the post-O2 sensor 26 in step 530 and control ends.

Figure 6:
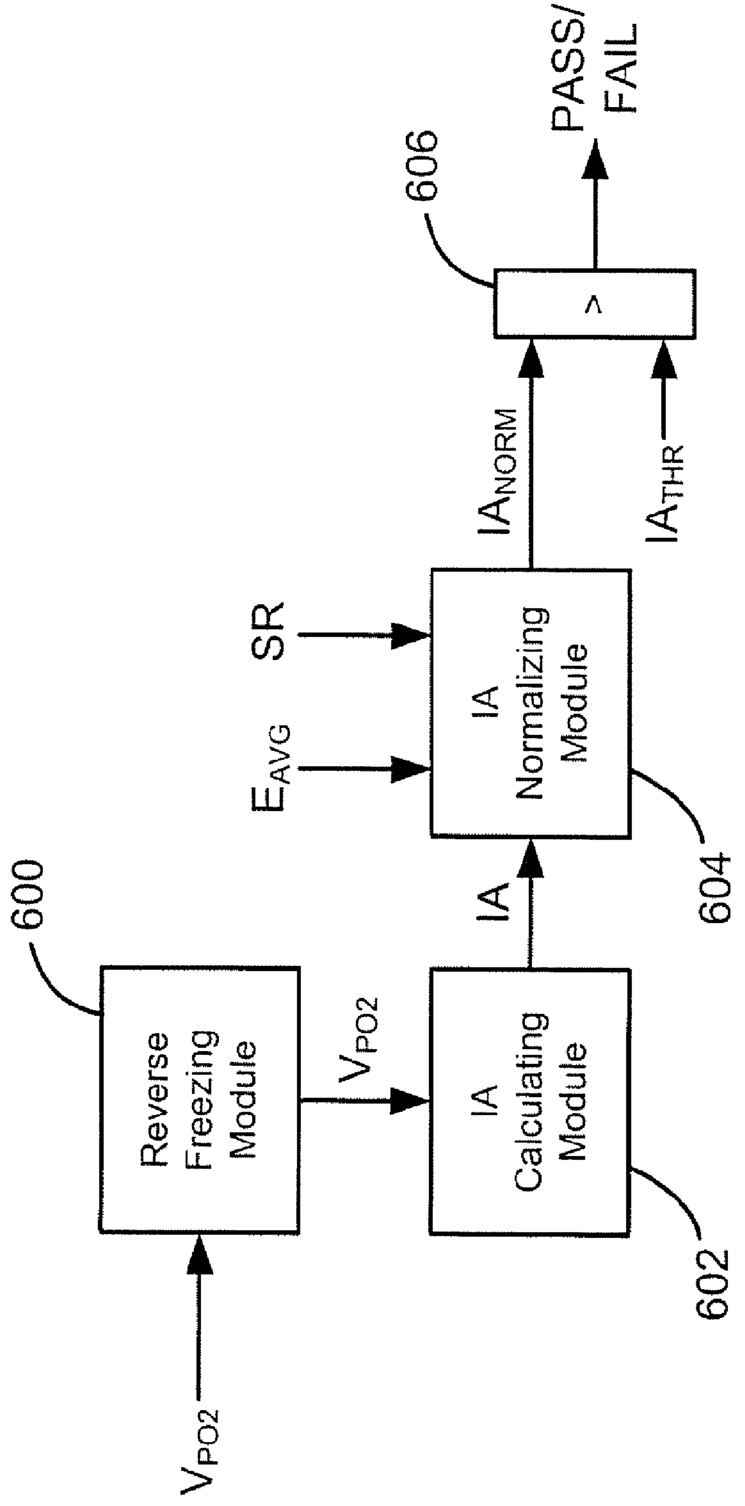
FIG. 6 is a functional block diagram of exemplary modules that execute the post-catalyst oxygen sensor diagnostic.

Referring now to FIG. 6, exemplary modules that execute the post-catalyst oxygen sensor diagnostic of the present invention will be described. The exemplary modules include a reverse freezing module 600, an IA calculating module 602, an IA normalizing module 604 and a comparator module 606. The reverse freezing module 600 monitors $V_{PO2}$ and forwards $V_{PO2}$ values to the IA calculating module 602. More specifically, the reverse freezing module 600 filters out any $V_{PO2}$ values that correspond to a reversal period ($t_{REV}$).

The IA calculating module 602 calculates IA based on the $V_{PO2}$ values forwarded by the reverse freezing module 600. The IA normalizing module 604 determines $IA_{NORM}$ based on IA. More specifically, the IA normalizing module 604 normalizes IA based on T, which is selected from pre-stored values based on the type of transition, and $E_{AVG}$ and/or SR. The comparator module 606 compares $IA_{NORM}$ and $IA_{THR}$ and generates a PASS or a FAIL signal based thereon. More specifically, if $IA_{NORM}$ is less than $IA_{THR}$, the comparator module 606 generates a PASS signal, and if $IA_{NORM}$ is not less than $IA_{THR}$, the comparator module 606 generates a FAIL signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine exhaust sensor diagnostic system for an exhaust system including a catalyst and a post-catalyst oxygen sensor, comprising:

a first module that calculates a total integrated area based on a signal generated by said post-catalyst oxygen sensor; and a second module that compares said total integrated area to a threshold integrated area and that generates a pass status signal when said total integrated area is less than said threshold integrated area.

2. The engine exhaust sensor diagnostic system of claim 1 wherein said second module generates a fail status signal when said total integrated area is not less than said threshold integrated area.

3. The engine exhaust sensor diagnostic system of claim 1 further comprising a third module that normalizes said total integrated area.

4. The engine exhaust sensor diagnostic system of claim 3 wherein said total integrated area is normalized based on an average flow rate of exhaust gas.

5. The engine exhaust sensor diagnostic system of claim 3 wherein said total integrated area is normalized based on a switching rate of a pre-catalyst oxygen sensor.

6. The engine exhaust sensor diagnostic system of claim 1 wherein said first module discounts an integrated area that is associated with a signal reversal from said total integrated area.

7. The engine exhaust sensor diagnostic system of claim 6 further comprising a third module that monitors said signal and that indicates said signal reversal when said signal exceeds a continuously updated minimum signal value during a rich to lean transition.

8. The engine exhaust sensor diagnostic system of claim 6 further comprising a third module that monitors said signal and that indicates said signal reversal when said signal falls below a continuously updated maximum signal value during a lean to rich transition.

9. A method of determining proper operation of a post-catalyst oxygen sensor, comprising:

calculating a total integrated area based on a signal generated by said post-catalyst oxygen sensor;

comparing said total integrated area to a threshold integrated area; and generating a pass status signal when said total integrated area is less than said threshold integrated area.

10. The method of claim 9 further comprising generating a fail status signal when said total integrated area is not less than said threshold integrated area.

11. The method of claim 9 further comprising normalizing said total integrated area.

12. The method of claim 11 wherein said total integrated area is normalized based on an average flow rate of exhaust gas.

13. The method of claim 11 wherein said total integrated area is normalized based on a switching rate of a pre-catalyst oxygen sensor.

14. The method of claim 9 further comprising discounting an integrated area that is associated with a signal reversal from said total integrated area.

15. The method of claim 14 further comprising:

monitoring said signal; and indicating said signal reversal when said signal exceeds a continuously updated minimum signal value during a rich to lean transition.

16. The method of claim 14 further comprising:

monitoring said signal; and indicating said signal reversal when said signal falls below a continuously updated maximum signal value during a lean to rich transition.

17. A method of determining proper operation of a post-catalyst oxygen sensor, comprising:

transitioning an air-to-fuel ratio between rich and lean;

calculating a total integrated area based on a signal generated by said post-catalyst oxygen sensor during a transition between rich and lean;

comparing said total integrated area to a threshold integrated area;

generating a pass status signal when said total integrated area is less than said threshold integrated area; and generating a fail status signal when said total integrated area is not less than said threshold integrated area.

18. The method of claim 17 further comprising normalizing said total integrated area.

19. The method of claim 18 wherein said total integrated area is normalized based on an average flow rate of exhaust gas.

20. The method of claim 18 wherein said total integrated area is normalized based on a switching rate of a pre-catalyst oxygen sensor.

21. The method of claim 17 further comprising discounting an integrated area that is associated with a signal reversal from said total integrated area.

22. The method of claim 21 further comprising:

monitoring said signal; and indicating said signal reversal when said signal exceeds a continuously updated minimum signal value during a rich to lean transition.

23. The method of claim 21 further comprising:

monitoring said signal; and indicating said signal reversal when said signal falls below a continuously updated maximum signal value during a lean to rich transition.

* * * * *